(12) United States Patent
Mathason et al.

(10) Patent No.: US 8,806,085 B2
(45) Date of Patent: Aug. 12, 2014

(54) APPLICATION SPECIFIC INTEGRATED CIRCUIT (ASIC) DISPOSED IN INPUT/OUTPUT MODULE CONNECTABLE TO PROGRAMMABLE LOGIC CONTROLLER (PLC) BASED SYSTEMS HAVING PLURALITY OF CONNECTION PATHS

(75) Inventors: Alan Paul Mathason, Philadelphia, PA (US); Daniel Milton Alley, Earlysville, VA (US); Stephen Emerson Douthit, Charlottesville, VA (US)

(73) Assignee: GE Intelligent Platforms, Inc., Charlottesville, VA (US)

( * ) Notice: Subject to any disclaimer, the term of this patent is extended or adjusted under 35 U.S.C. 154(b) by 28 days.

(21) Appl. No.: 13/570,575

(22) Filed: Aug. 9, 2012

(65) Prior Publication Data

US 2014/0047137 A1 Feb. 13, 2014

(51) Int. Cl.
*G06F 3/00* (2006.01)

(52) U.S. Cl.
USPC .................. 710/33; 710/34; 710/35; 710/36; 710/37; 710/38; 710/260

(58) Field of Classification Search
USPC .............................................. 710/33–38, 260
See application file for complete search history.

(56) References Cited

U.S. PATENT DOCUMENTS

| | | | |
|---|---|---|---|
| 5,768,598 A * | 6/1998 | Marisetty et al. ............. | 710/260 |
| 6,389,379 B1 | 5/2002 | Lin et al. | |
| 6,748,457 B2 * | 6/2004 | Fallon et al. ...................... | 710/2 |
| 6,810,479 B1 | 10/2004 | Barlow et al. | |
| 6,816,919 B2 | 11/2004 | Gareis et al. | |
| 7,070,099 B2 | 7/2006 | Patel | |
| 7,216,191 B2 | 5/2007 | Sagues et al. | |
| 7,290,244 B2 | 10/2007 | Peck et al. | |
| 7,598,766 B2 | 10/2009 | Mercaldi-Kim et al. | |
| 7,613,900 B2 | 11/2009 | Gonzalez | |
| 7,683,661 B2 | 3/2010 | Johnson | |
| 7,752,341 B2 | 7/2010 | Kawaguchi | |
| 7,759,945 B2 | 7/2010 | Wade | |
| 7,932,736 B2 | 4/2011 | Varadarajan et al. | |
| 2004/0128627 A1 | 7/2004 | Zayas | |

FOREIGN PATENT DOCUMENTS

EP    1296248 A2    3/2003

OTHER PUBLICATIONS

"XPressArray®-II: 0.15μm Structured ASIC", ON Semiconductor.
Jim Pinto, "Networked,Intelligent I/O," 1994. First Published: ISA Proceedings 1994 and Intech Jul. 1995. Updated Dec. 1999. (webmaster@jimpinto.com.).
Stephane Donnay, et al. "Using Top-Down CAD Tools for Mixed Analog/Digital Asics:A Practical Design Case." Analog Integrated Circuits and Signal Processing. vol. 10, Nos. 1-2, 101-117, DOI: 10.1007/BF00713982.

* cited by examiner

*Primary Examiner* — Tammara Peyton
(74) *Attorney, Agent, or Firm* — Global Patent Operation; Mark A. Conklin

(57) ABSTRACT

An input/output module for use in an industrial control system and connectable to a programmable logic controller (PLC), the input/output module having an interface configured for an electrical connection to the PLC, a plurality of pins configured for connection to one of a plurality of peripherals, an application specific integrated circuit (ASIC) disposed in the I/O module and electrically coupled to a system controller, the ASIC having a plurality of connection paths, each path being configured for a function, and a switch block configured to reassign a signal from a first connection path of the plurality of connection paths to a second connection path of the plurality of connection paths.

28 Claims, 15 Drawing Sheets

APPLICATION SPECIFIC INTEGRATED CIRCUIT (ASIC) DISPOSED IN INPUT/OUTPUT MODULE CONNECTABLE TO PROGRAMMABLE LOGIC CONTROLLER (PLC) BASED SYSTEMS HAVING PLURALITY OF CONNECTION PATHS

BACKGROUND OF THE INVENTION

1. Field of the Invention

The field of the invention relates generally to programmable logic controller (PLC) based industrial control systems. More particularly, the invention relates to certain new and useful advances for input/output (I/O) modules and application specific integrated circuitry (ASIC) for driving a plurality of I/O functions.

2. Description of Related Art

A complex automated industrial system requires an organized hierarchy of controller systems to function. Generally, the hierarchy includes a Human Machine Interface (HMI) linked to programmable logic controllers (PLC) via a non-time-critical communications system (e.g. Ethernet). At the bottom of the control chain is a central processing unit (CPU) which has a subsystem (i.e., a bus) that transfers data between components inside the CPU and links the PLCs to the delta point of a peripheral that performs certain tasks and gather data, such as sensors, actuators, electric motors, console lights, switches, valves and contactors.

PLCs have the facility for extensive input/output (I/O) arrangements, typically held in PLC racks, which connect the PLC to sensors and actuators. The I/O arrangements may be built into a simple PLC, or the PLC may have external I/O modules attached to a computer network that plugs into the PLC through the PLC rack. The PLC rack typically comprises a predetermined number of slots, which are dedicated modules for a single function Typically, a multitude of different electrical parts and integrated circuits are used to drive each one of the specific input/output configurations. When users install I/O modules into PLC racks, they individually wire each point that is being controlled to the specific I/O point. Generally, each point in the module is individually wired to connect the I/O module to the machine interface, and a cable customized to the specifically wired I/O module is utilized. Therefore, to connect different machine interfaces to the same I/O module, multiple customized connector cables are utilized. Furthermore, PLC control racks only have a certain number of slots, and extending each PLC rack can prove to be expensive and time consuming. While smaller industrial systems may only require between 16 and 32 points, large systems may comprise ten-thousand to thirty-thousand points, at which point it becomes unfeasible to store enough modules to control each function. Over the past decades this has resulted in a large number of fragmented product offerings that are difficult to source, maintain and support.

Systems have been developed that attempt to alleviate this problem. For example, a system for configuring a reconfigurable I/O (RIO) device to perform a function in response to user requirements has been provided. A configuration generation program generates a hardware configuration program based on the user input, and the hardware configuration program is usable to configure a device to perform the function, where the device includes a programmable hardware element and one or more fixed hardware resources coupled to the programmable hardware element.

Another example, includes a soft I/O system has been developed in which any I/O connector pin of the soft-I/O can be an input, output, power or ground such that the number of switches and channels can be reduced.

However, the above described ad hoc approaches are not useful in industrial settings, particularly where high-level electronic noise is prevalent. Moreover, the above-described approaches require additional noise suppression components which can be costly and are not conducive to large scales.

Accordingly, to date, no suitable hardware based apparatus or method processing and driving a plurality of I/O functions suitable for industrial environments exists.

BRIEF SUMMARY OF THE INVENTION

The present disclosure describes an I/O module and application specific integrated circuitry (ASIC) for driving a plurality of I/O functions, together with an industrial control system for controlling processes. The input/output module is for use in an industrial control system and connectable to a programmable logic controller (PLC). The input/output module comprises a housing for coupling the I/O module to the PLC configured for input and output devices, a local I/O connector having a plurality of pins configured for connection to one of a plurality of peripherals to the I/O module, and an application specific integrated circuit (ASIC) disposed in the I/O module and electrically coupled to a system controller, the ASIC having a plurality of dedicated connection paths, each path being configured for a function, and a switch block configured to reassign a signal from a first connection path of the plurality of connection paths to a second connection path of the plurality of connection paths.

Also, a control system is provided having a programmable logic controller (PLC), the control system comprising a systems controller in communication with a network and coupled to the PLC, an input/output (I/O) module connected to the PLC, and configured to drive a plurality of functions through a single or group of I/O pins.

Benefits over and difference from prior approaches is the ability to handle, process and drive a multitude of electrical input and output functions through the electrical pin using a switch-block, while reducing the number components needed for full systems.

BRIEF DESCRIPTION OF THE DRAWINGS

Other features and advantages of the disclosure will become apparent by reference to the accompanying drawings, in which.

DETAILED DESCRIPTION

Figure 1:
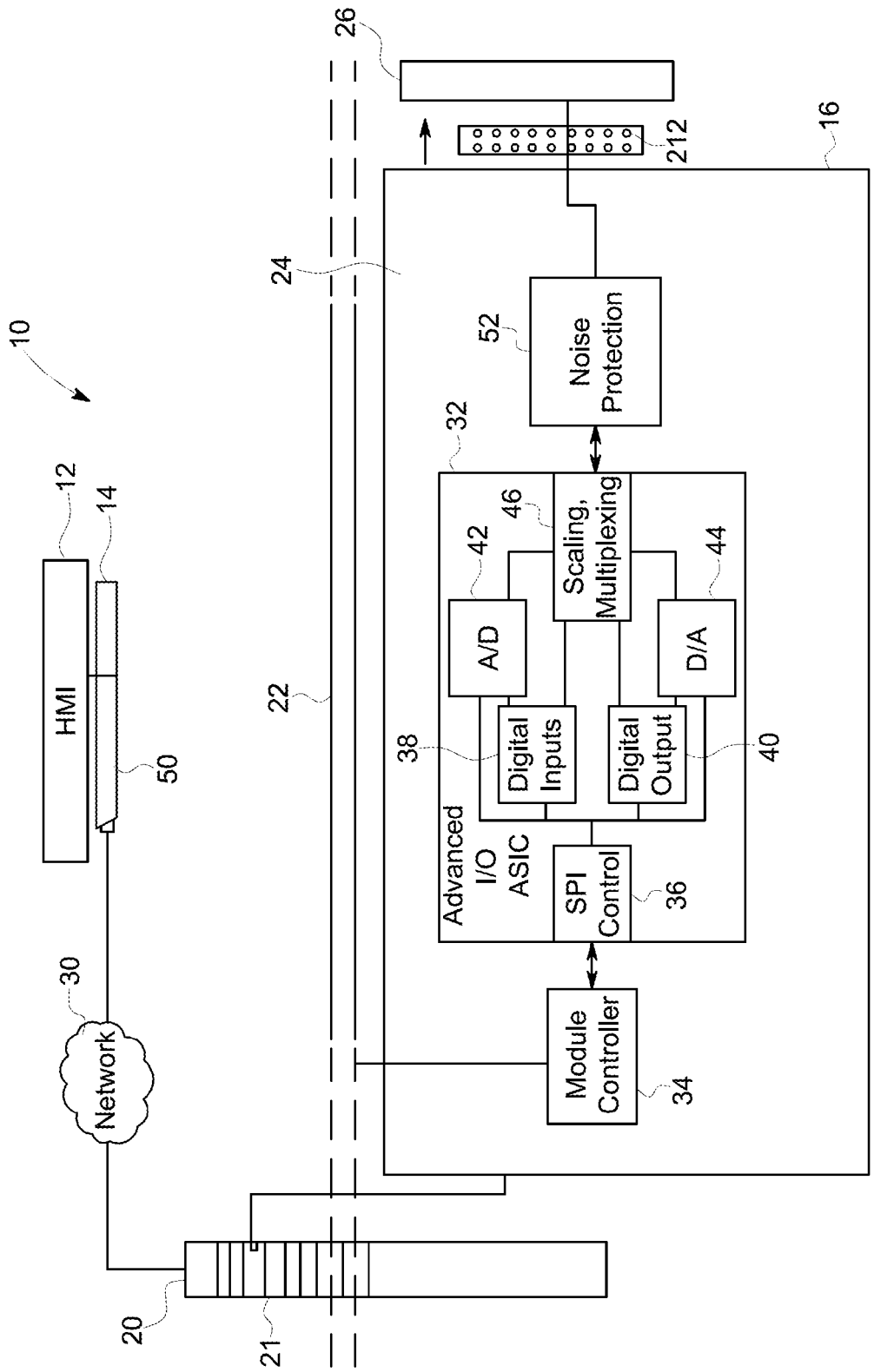
FIG. 1 is a schematic block diagram of an exemplary industrial control system in accordance with an embodiment of the present invention.

Embodiments of the present invention describe an apparatus for relates to an I/O module application specific integrated circuit (ASIC) specially designed to handle, process and drive a plurality of electrical input and output functions through one or more electrical pins. In optional embodiment, each function is user-configurable. Embodiments of the present invention integrates multiple I/O functions onto a single die, each of the I/O functions programmable through one or more electrical pads or pins on the chip. The different modes of operation can be chosen by the user of the integrated circuit. Issues such as integration, physical size, co-performance, de-coupling, protection, configurability and performance ranging are being addressed by the present invention.

As used herein, the term "peripheral(s)" may refer to sensors or actuators (e.g., electric motors, pneumatic or hydraulic cylinders, magnetic relays, solenoids, etc.), console lights, switches, valves contactors and the like connected into a control loop. A sweep sample time is defined as the interval in which the CPU executes a scan on the peripherals. For example, during a sweep time, the CPU can receive data from input logic, run the data, and output the data to an output module.

As used herein, the term "point" refers to channels or connection points in an I/O module. For example, an I/O may comprise standard 16 or 32 channels for a module providing a specific function, or, in exemplary embodiments of the present invention, a module may comprise a plurality of channels each providing different functions (e.g., a single module for digital input, driving a motor, reading a sensor, etc.).

In an exemplary embodiment of the present invention, the industrial control system may comprise a central processing unit (CPU) comprising a chassis that houses a processor and an industrial bus. The CPU is in communication with an input/output module, which is loadable into a PLC rack. The central processing unit has a processor configured to execute programmable instructions, which when executed by the processor causes the processor to send and receive commands to and from the peripherals via the PLC I/O module, each of which will be discussed in greater detail below with reference to the Figures.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to industrial plants, a skilled artisan will recognize that embodiments of the invention can be implemented in other similar fields.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

With reference now to FIG. 1, a block diagram of an exemplary system 10 for use with the present invention is shown generally. In this exemplary embodiment, a human machine interface (HMI) 12 is coupled to the principal CPU 14, which is coupled to a local area network 30. The network may be supported by Ethernet, for example. The CPU 14 may be further coupled to a PLC 20, which includes multiple I/Os, which correspond to a variety of functions. The system processor may include microprocessors, random-access memory ("RAM") and read-only memory ("ROM"). The PLC 20 is configured to provide hard real time system for the peripherals 26 to operate. In exemplary embodiment of the present invention, the I/O module 24 provides for a plurality of functions in a single I/O module contained in a housing 16.

The I/O module 24 may be used to provide the connections and adapt the signals into a usable form for both the peripheral 26 and the PLC 20. While as shown in FIG. 1, the I/O module 24 is external, in optional embodiments of the present invention, the I/O 10 may be internally embedded or mounted into respective slots located on a PLC rack (or backplane board) in the PLC 20.

Referring still to FIG. 1, the I/O module 24 is configured to connect to a plurality of peripherals 26 to the PLC 20 and CPU 14. The I/O module 24 is further configured to convert an external signal from the peripheral into a form usable by the logic circuits connected to CPU 14, and also to receive signals from the CPU 14 and convert the signals into a form usable by the peripherals 26. In an exemplary embodiment, the PLC 20 has analog inputs and analog outputs, which may be, for example, 4-20 mA, 0-5V, serial (i.e., RS422), Mod-Bus, Ethernet, and the like. However, it should be noted that I/O module shown in FIG. 1 may be connected to a DCS system, SCADA or HMI by a RS232 or RS485 communication cable.

The CPU 14 is configured to receive signals from the PLC 20, which in turn, receives signals from the peripheral 26 through the IO module 24, which indicates predetermined states or conditions of the peripherals 26. An application-specific integrated circuit ("ASIC") 32 is included in the I/O module 24 and connected to the PLC through bus 22 residing on the rack. The ASIC 32 provides the connections for the electric pathways, and may be adapted based on signal type. The ASIC 32 may be coupled to a module controller 34, which may comprise RAM and ROM. The ROM may contain the operating system for the module 24 and may either be EPROM or Flash EPROM depending on the type of PLC employed. The RAM may be used for operating data storage parameters within the module's software routines as referenced by the system controller 50.

The system controller 50 may comprise a microprocessor RAM and ROM. Similar to the module controller The ROM contains the operating system for the system controller 50 and may either be EPROM or Flash EPROM depending on the type of PLC. The RAM is used for operating system data storage as well as storing control programs that the operator has compiled into executable code. The system controller 50 may further have additional components in the digital logic circuit such as Ethernet, universal asynchronous receiver transmitters, conditioning circuits, high speed counters, watchdog circuitry and bus interfaces for example, which facilitate execution of a control system. In an optional embodiment, system controller 50 may absorb the operations of the module controller 34, eliminating the components of the module controller 34 as a simplification of hardware at the expense of additional processing timing.

With further reference to FIG. 1, a block diagram of an I/O ASIC is shown at reference numeral 32. The ASIC 32 may be configured to implement universal analog, discrete 24VDC I/O, and digital I/O functions and the like, thereby minimizing external parts required to provide the I/O channel as implemented between the module controller 34, CPU 14 and the peripherals 26. The ASIC 32 may provide multiple channels, which may be incorporated into the scaling and multiplexing module 46, the ASIC being able to support a programmable combination of inputs or output modes. In an exemplary embodiment of the present invention, ASIC channels, which may reside on the scaling and multiplexing module 46, permit a point or group of channels to be electrically isolated to a single die, each channel being dedicated to a different function (see FIG. 12). A serial peripheral interface (SPI) 36 is connected to digital input 38 and digital output 40, and is configured as a synchronous serial data link that operates in full duplex mode. The SPI 36 is connected to the module controller 34 which, while shown as residing on the I/O module 24, may also be external. In optional embodiments, the SPI 36 is further coupled, in parallel, to analog to digital converter 42 and digital to analog converter 44. The digital input 38 is also coupled to an analog to digital converter 42, and digital output 40 is coupled to digital to analog converter 44. The digital input 38 and digital output 40 may be further coupled the scaling and multiplexing module 46. In optional embodiments of the present invention, the ASIC 32 may be configured to support either individual serial paths or a combination of ASIC devices within a serial chain of interconnected ASICs allowing for individual changes within each ASIC.

Referring still to FIG. 1, the scaling and multiplexing module 46 comprises channels (shown in FIG. 4) that provide for scalability and resource savings. In an exemplary embodiment of the present invention, the scaling and multiplexing module 46 may support delta sigma modulated (DSM) I/O bit streams for HART FPGA modem. The DSM I/O may be shared with general purpose I/O (GPIO) pins, where available, with the fully decimated and filtered data also made available to the SPI interface 36. HART modem connections may also be provided by analog signal paths, allowing transmit tones to be summed with the signal setpoints to the D/A converter 44 and received tones provided by AC coupled paths from the feedback signals to the A/D converter 42.

A noise protection module 52 is disposed inside of the I/O module and in electrical communication 32 with the ASIC 32 through multiplexing module 46. The noise protection module 52 may comprise devices to suppress large amounts of electromagnetic energy. In exemplary embodiments of the present invention, the noise protection module 52 residing inside the I/O module increases flexibility to the module, while decreasing the need for external devices (e.g., absorption and suppression devices), particularly if the electrical common is on a fixed terminal (e.g., one which user must purchase apart from the I/O module and connect to the I/O).

In this exemplary embodiment, the internal noise protection module 52 is configured to establish electromagnetic compatibility to industrial standards without the complexity outside of the I/O module.

Figure 2:
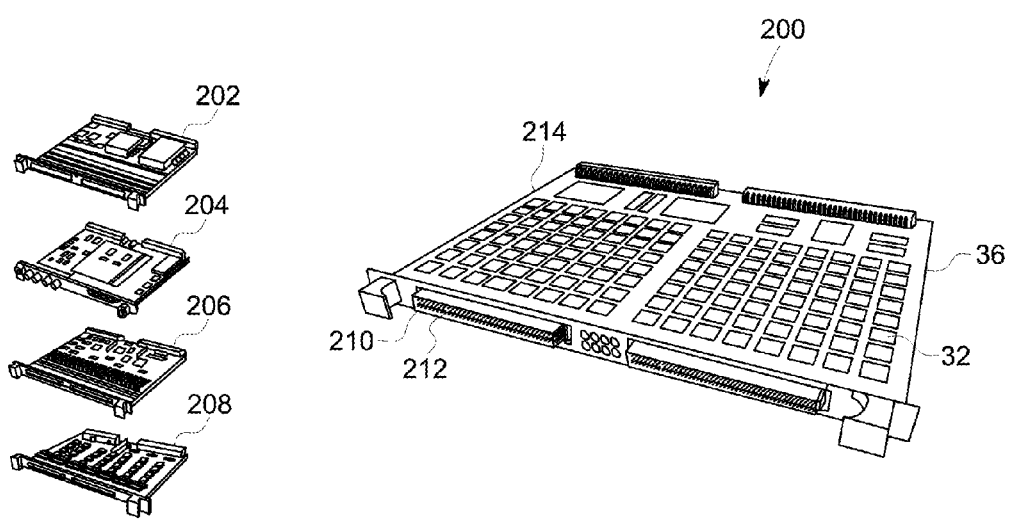
FIG. 2 is a perspective view of a I/O module in accordance with an embodiment of the present invention.

Referring now to FIG. 2, a perspective view of an ASIC board applicable in the present invention, having configurable I/O is shown generally at 200. The ASIC 32 may be assembled within a circuit board to perform as a high density, fully configurable I/O module, mimicking the behavior of an analog in module 202, analog out module 204, digital in module 206 and digital out module 208, each being compressed on a single card 214. In optional embodiments of the present invention, the single card 214 may be designed to move the switch network and high voltage sections onto the chip. The card 214 comprises GPIO 210 signals, which are fully configurable, via connector pins 212. For example, the single I/O module 24, which comprises the card 214, is capable of multiple functions. In this example, the functions may comprise digital input and output, analog input and output, drivers for solenoids and drivers for motors. The user may configure the SPI module 36 containing the high density card 214 based upon the user's needs.

For example, the user may desire only digital in and motor driving capabilities. Thus, the user can configure the SPI module 36 to perform only those functions, while having the flexibility to use the analog and solenoid driving functions in the future, through the single I/O module 24. This is achieved by the scaling and multiplexing block 46, which is configured to establish the proper connections to use the required peripherals. In exemplary embodiments of the present invention, the scaling and multiplexing block is implemented such that crosstalk, which is electrical interaction between channels due to electrical interference, is not an impediment to system performance. In this embodiment, the card 214 is configured with internal shielding between signal traces and use of inner power and ground planes.

In operation, the ASIC includes logic level I/O signals operating with 'low-voltage' logic levels. In exemplary embodiments of the present invention, the pins 210 support multiple uses, and are individually programmable for use and direction by the SPI interface. All GPIOs 210 may be set to input and may be pulled up/down during power up and reset. Exemplary uses for each of the GPIOs include, for example, DSM inputs to feed the internal DACs for HART modulation, DSM outputs from the ADC channels for HART demodulation, and fault outputs from the contact outputs for alarm indication. The multiplexer 46 and the module controller 34 provide an output that can be coupled to a serial port on the on the I/O module. The serial port acts as physical interface for data transfer. In an exemplary embodiment of the present invention, the serial port supports status polling on a continuous basis and/or programming the ASIC. The serial port may operate with 8, 16, or 32 bit transfers possible, and may be selected by the length of the select pulse and/or port settings.

Figure 3:
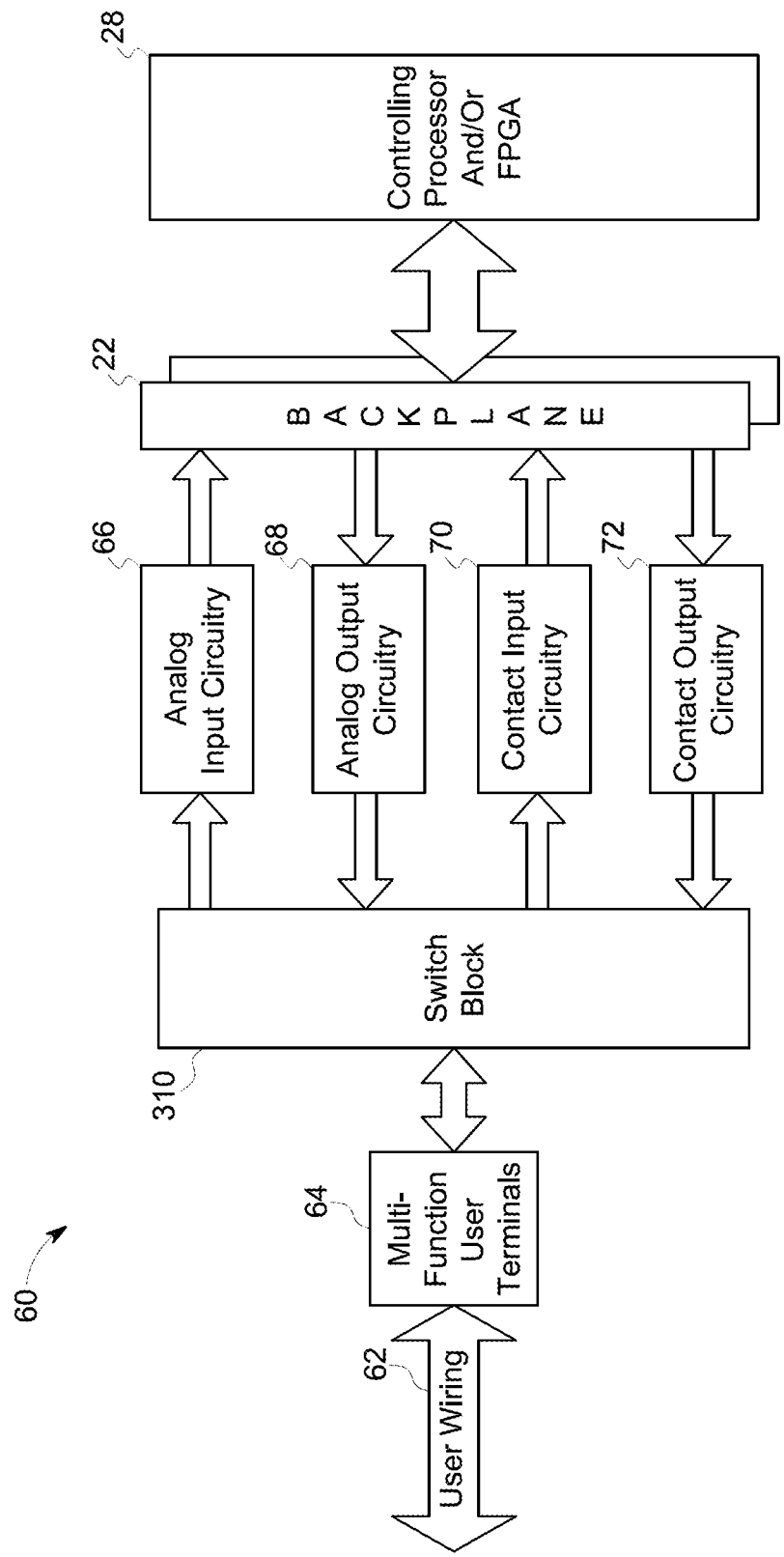
FIG. 3 is a block diagram of an ASIC in accordance with an embodiment of the present invention.

Referring now to FIG. 3, a block diagram of an exemplary ASIC including the switch block for assigned circuits and signal flow paths are shown generally at 60. In this exemplary embodiment, user wiring 62 may be connected to a multi-function user terminal 64. The user terminal may then be coupled to the switch block 310. The switch block 310 may comprise multiple channels, and have a universal I/O channel allowing for multiple, random, programmable arrangements of sensors and actuators on the control module 24. The switch block 310 may have two or more channels, which are discussed further with reference to FIGS. 12-15. The switch block 310 is coupled to analog input circuitry 66, analog output circuitry 68, contact input circuitry 70 and contact output circuitry 72. The use of the switch block 310 in conjunction with controlling processor 28, which is connected through backplane 22, obviates the need for multiple modules in the control system and the factory support that the module sets entail. Backplane 22 may be used to pass separate signal busses to the circuits (FIG. 3) or a combined serial or parallel bus (FIG. 4) that merges the information onto a shared data path. A typical design as in FIG. 4 would insert a serial interface 74 and register set to allow information via the backplane 22 to flow to the section of circuitry within the ASIC based on information addressing within the data transfer from the controller 28. Further, the ASIC may be split to allow use of external ADC components. This reduces the schedule risk, with the former ASIC now becoming a combination of a reduced ASIC and other analog parts as a chip set. It should be noted that processor 28, in optional embodiments, may comprise a field programmable gate array (FPGA).

Figure 4:
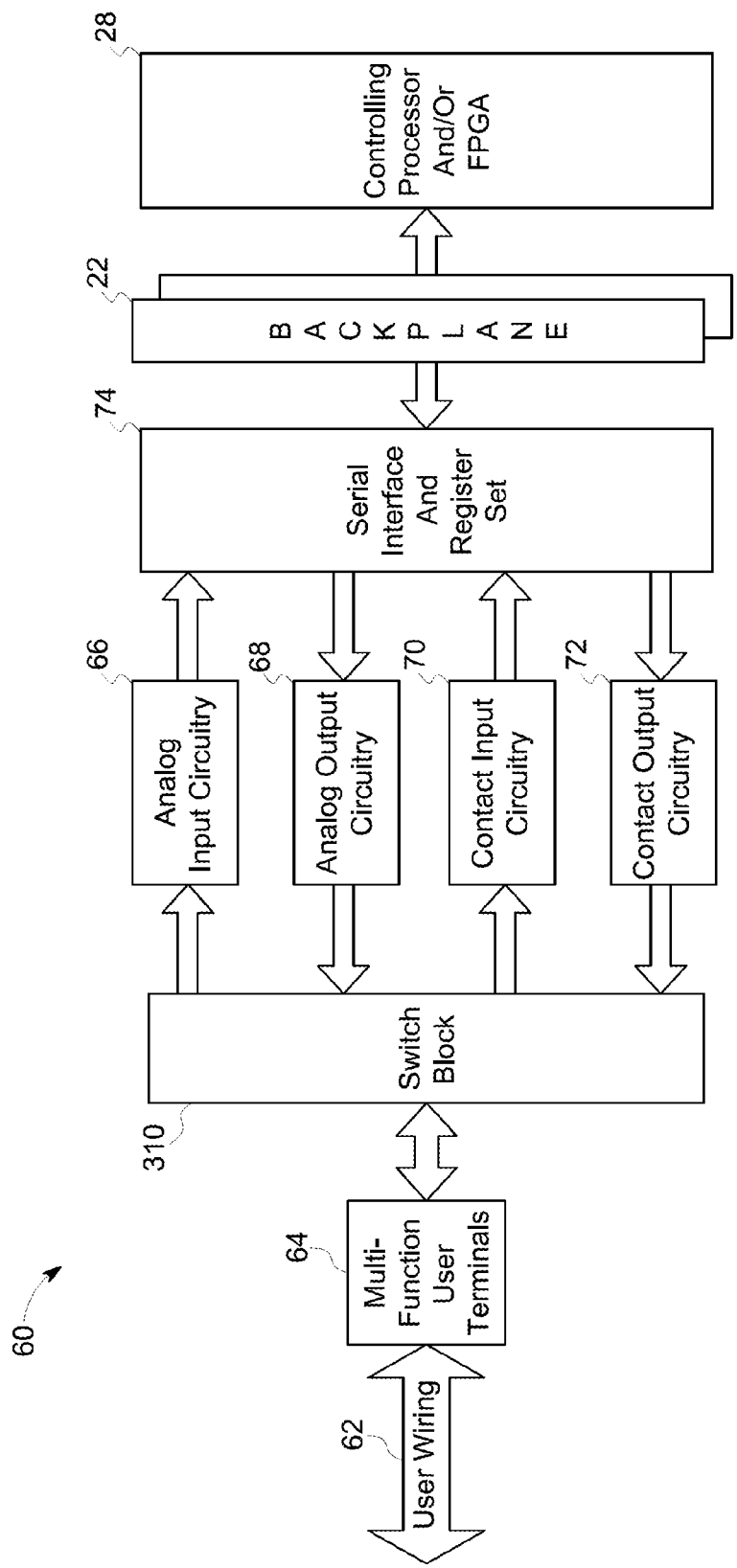
FIG. 4 is a another block diagram of an ASIC in accordance with an embodiment of the present invention.

With reference now to FIG. 4, a block diagram including the switch block for assigned circuits and signal flow paths are shown generally at 60. Like the embodiment shown in FIG. 3, in this exemplary embodiment, user wiring 62 may be connected to a multifunction user terminal 64, which is coupled to the switch block 310. The switch block 310 is coupled to analog input circuitry 66, analog output circuitry 68, contact input circuitry 70 and contact output circuitry 72. However, in this embodiment, a serial interface 74 is provided, and is coupled to the analog I/O 66, 68 and contact I/O 70, 72 which is coupled to the processor 28. The serial interface functions to reduce the number of connections need from the processor or gate array to the user terminal 64. Further, the serial interface may comprise a predetermined register set.

Figure 5:
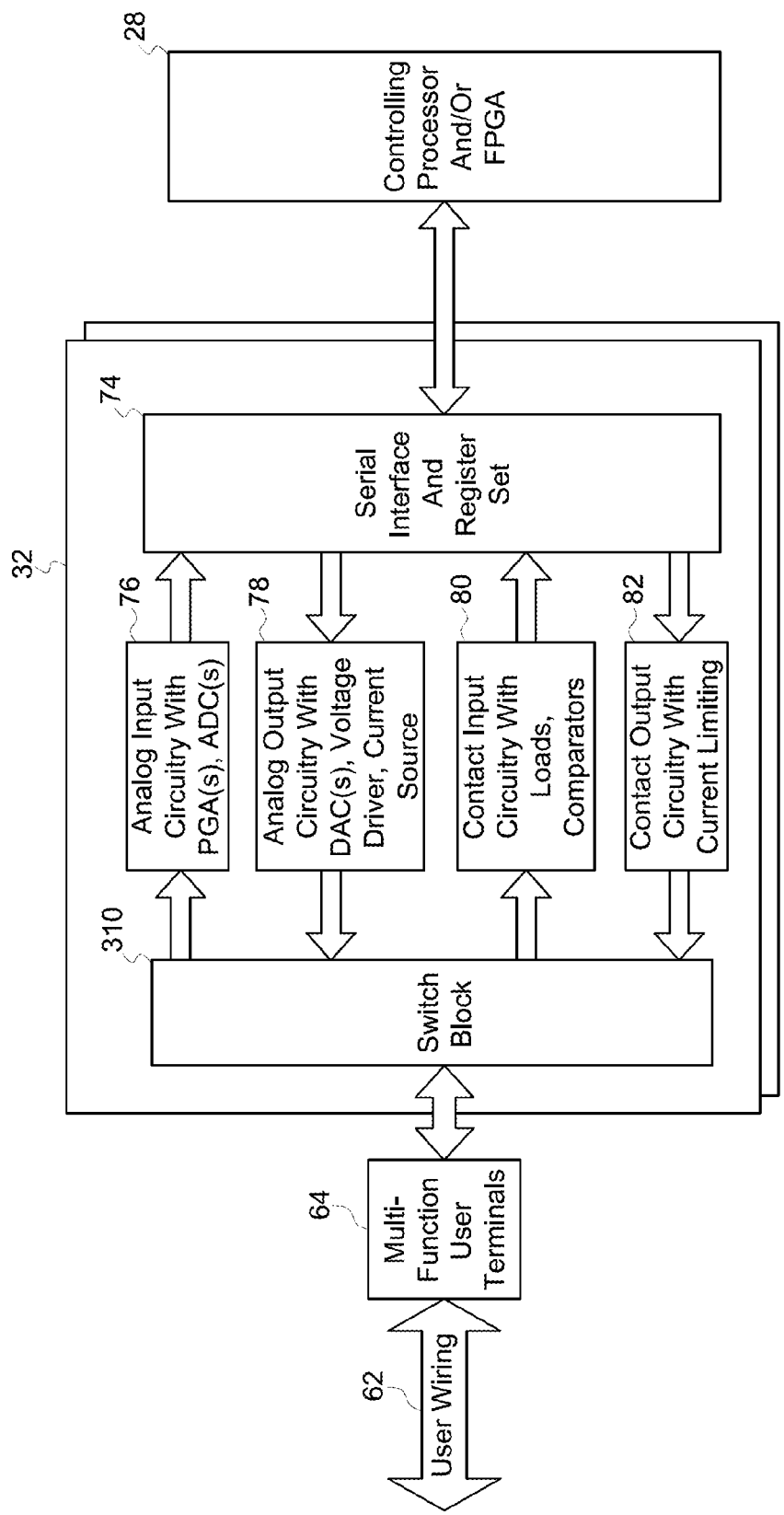
FIG. 5 is a block diagram of an ASIC in accordance with an embodiment of the present invention.

In embodiments of the present invention, and as shown in FIG. 5, the switch block 310, the analog I/Os and contact I/Os along with serial interface 74 (and register set) may be included on and as part of the ASIC 32. The ASIC 32 may then be coupled the user terminal 64 and also to the processor 28. Furthermore, as shown in FIG. 5, an analog input 76 may also comprise programmable gain amplifiers (PGAs) and analog to digital converters (ADCs) for voltage sensing. The analog output 78 may comprise DACs, voltage drivers, and a current source. The contact input may further comprise contact input circuitry with loads and comparators, whereas the contact output 82 may comprise current limiting circuitry.

Figure 6:
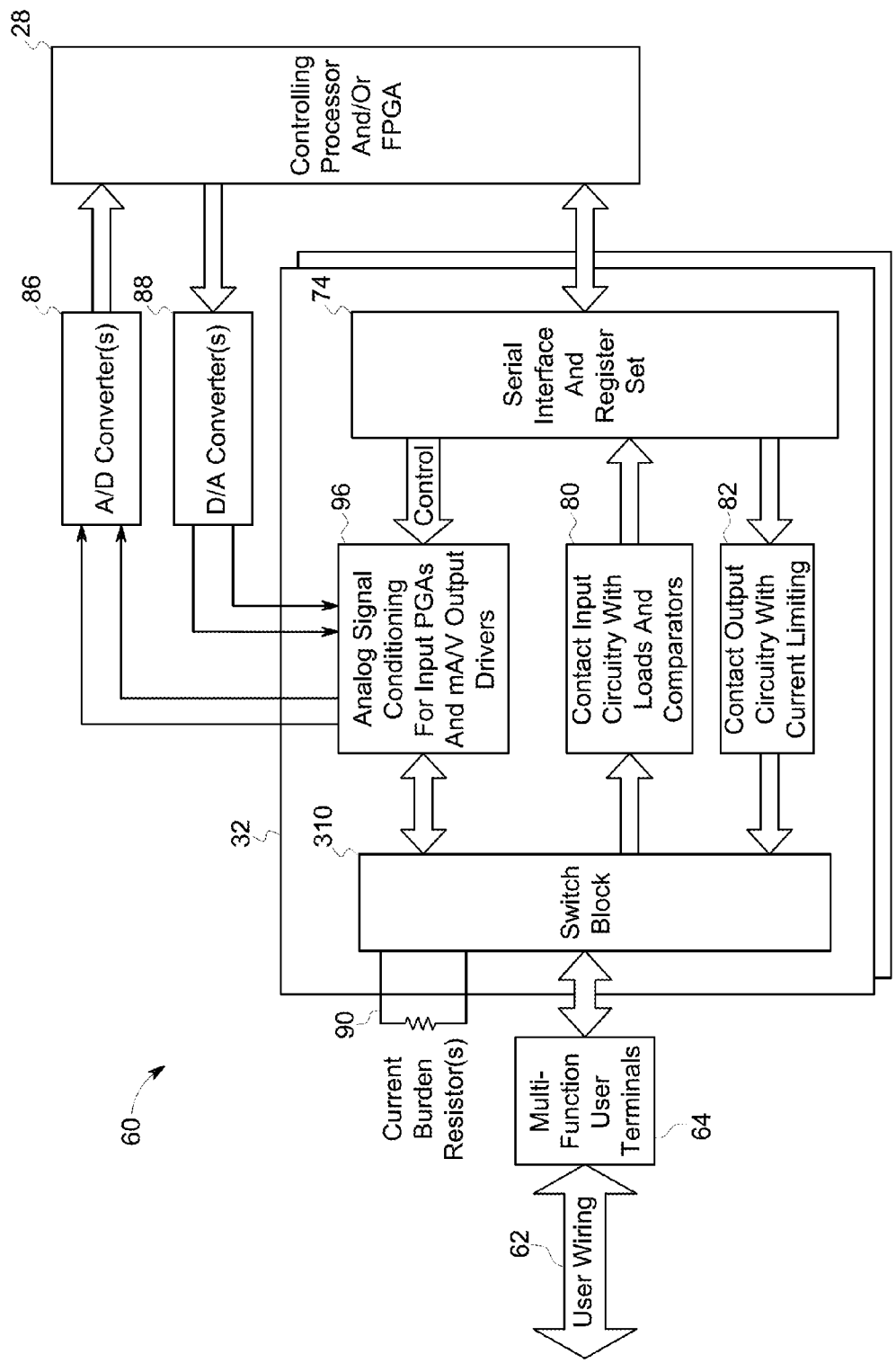
FIG. 6 is a block diagram of an ASIC in accordance with an embodiment of the present invention.

In an exemplary embodiment of the present invention, ADCs 86 and DACs 88 are external to the ASIC 32, and coupled to an analog signal conditioning circuit for input PGAs and mA/V output drivers, as shown in FIG. 6. The ADCs 86 and DACs 88 are further coupled to the controlling processor 28. In operation, the ASIC 32 connects to the external ADC 86 for voltage sensing, the signal span being controlled via programmable attenuator/amplifiers on the ASIC 32. When current is being sensed, the voltage is measured across a current burden resistor 90 via the switch block 310. The resistors 90 are external to the ASIC to allow higher precision parts, as well as configuring the design for a particular current range target. If resistors 90 are internal to the ASIC, then performance is subject to the ASIC trimmed resistor accuracy. Analog control settings may be provided to the ASIC 32 from external DAC circuits 88, which may either be delta-sigma with filtering or structured. The DAC inputs, ADC outputs, and serial control path all pass to a controlling processor 28 (FPGA or CPLD) device serving as the interface to the signal processing hardware within the control system. In an optional embodiment of the present invention, ADCs 86 and DACs 88 may be internal elements to the ASIC 32, while still being coupled to an analog signal conditioning circuit for input PGAs and mA/V output drivers, block 90.

The switch block 310, which is configured to assign circuit sections to user terminals, may be coupled to current burden resistor 90, which may be configured to convert current to an output voltage. Further, the performance of this resistor ensures for the accuracy, temperature behavior, and settling time of the circuit. These the switch block may assign include, for example, voltage drivers, current drivers, solid state high side switches, solid state low side switches, current burden resistors, and analog comparators for contact input sensing. The routing of external signals from the user terminals to the circuit sections is, in this exemplary embodiment, controlled by the serial interface 74.

Figure 7:
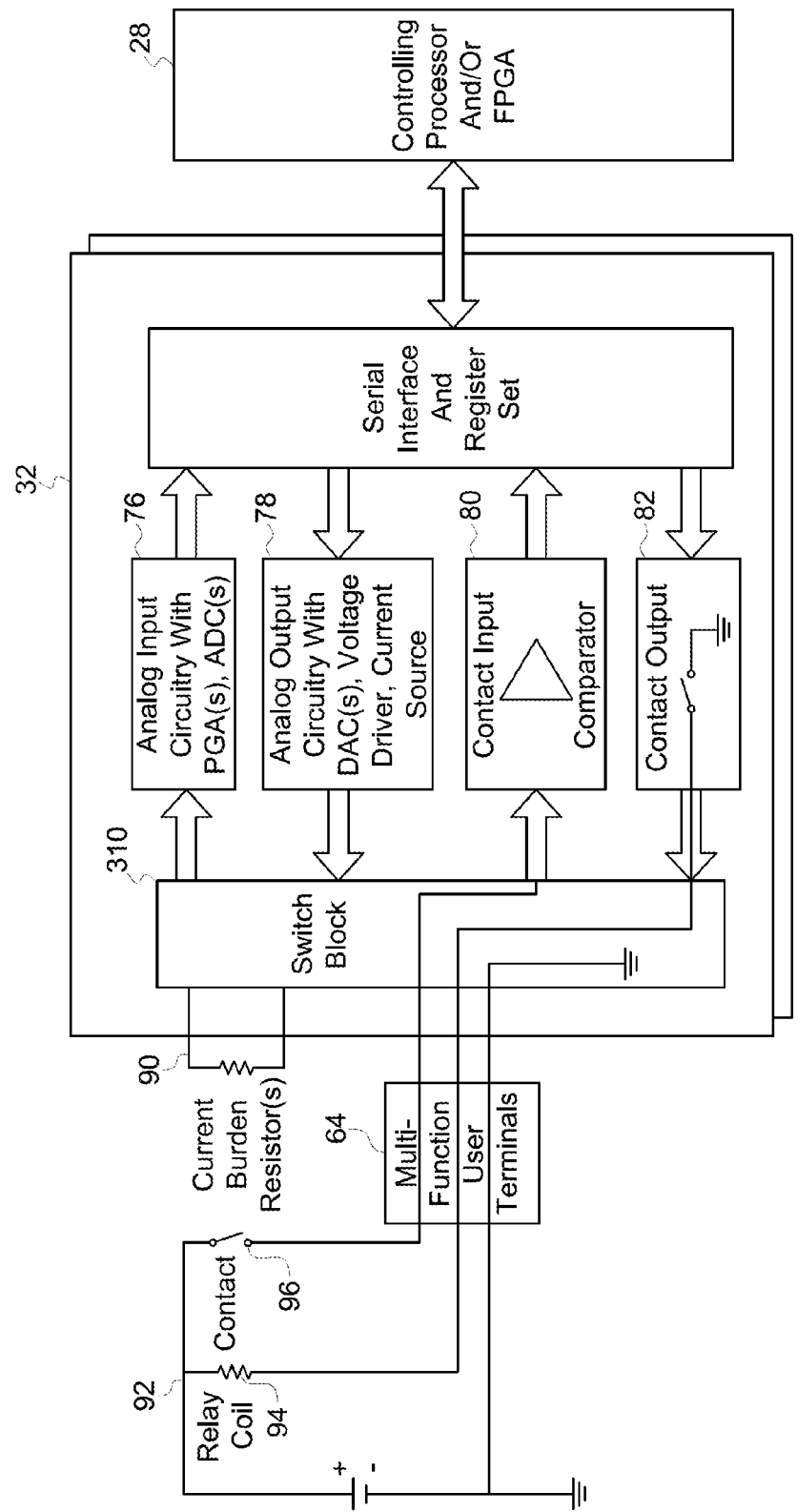
FIG. 7 is a block diagram of an ASIC in accordance with an embodiment of the present invention.

Referring now to FIGS. 7-11, exemplary channel configurations are shown together with optional configurations of user terminal wiring. FIG. 7 is a block diagram of the ASIC 32 configured with contact input 80 on one channel and a low side contact output 82 on a second channel. Each of the contact output 80 is connected to an external contact though the switch block 310 and a connection within user terminal 64. The user wiring 92, in this exemplary embodiment, comprises a relay coil 94 and a contact 96. The relay coil 94 is controlled by current passed via switch block 310 to the contact output 82, with the output in turn interfaced via the register set and serial path to the system controller. The contact 96 similarly passes through the switch block using different signal paths to reach the contact input 80, which may have a comparator for sensing if the voltage from the switch occurs (switch closed) or not (switch open). The comparator passes its output to the serial interface register set for monitoring by the controller 28 via the serial path.

Figure 8:
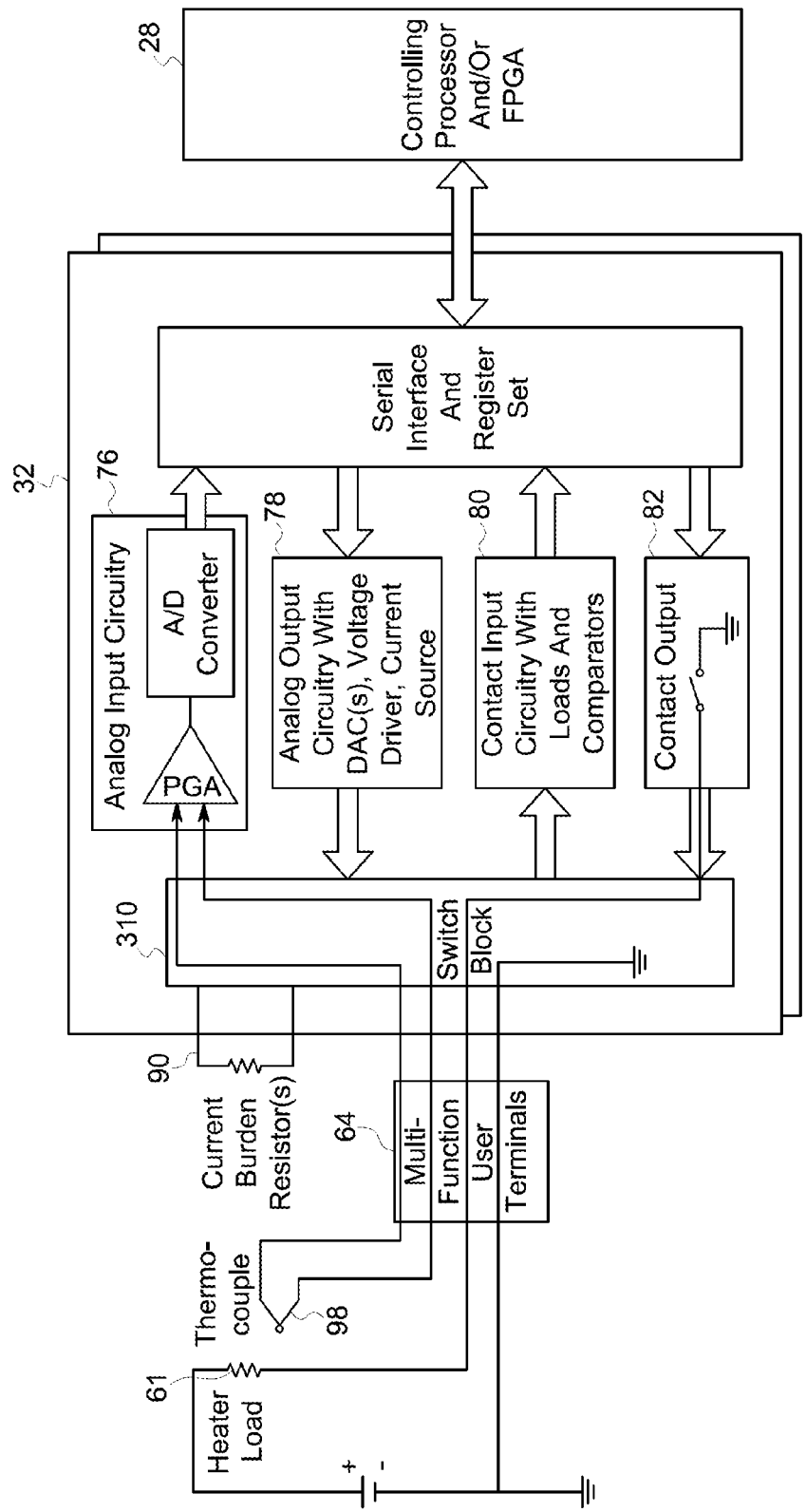
FIG. 8 is a block diagram of an ASIC in accordance with an embodiment of the present invention.

FIG. 8 is block diagram of another exemplary embodiment of an ASIC that is configured for a thermocouple or voltage input 80 on a first channel and a low side contact output 82 on a second channel. Like FIG. 7, the contact output 80 is connected to an external heater load 61 though the switch block 310 and user terminal block 64. The user wiring 92, in this exemplary embodiment, comprises a thermocouple 98 and heater load 61. Furthermore, in this exemplary embodiment, the analog input circuitry 76 may comprise a PGA and ADC. The heater load 61 is controlled by current passed via switch block 310 to the contact output 82, with the output in turn interfaced via the register set and serial path to the system controller. The thermocouple 98 signal passes via separate signal paths in the switch block to the analog input circuitry 76 with the PGA amplifying the low level signal to a level measured by the A/D converter. The conversion results pass to the register set for access by the system controller.

Figure 9:
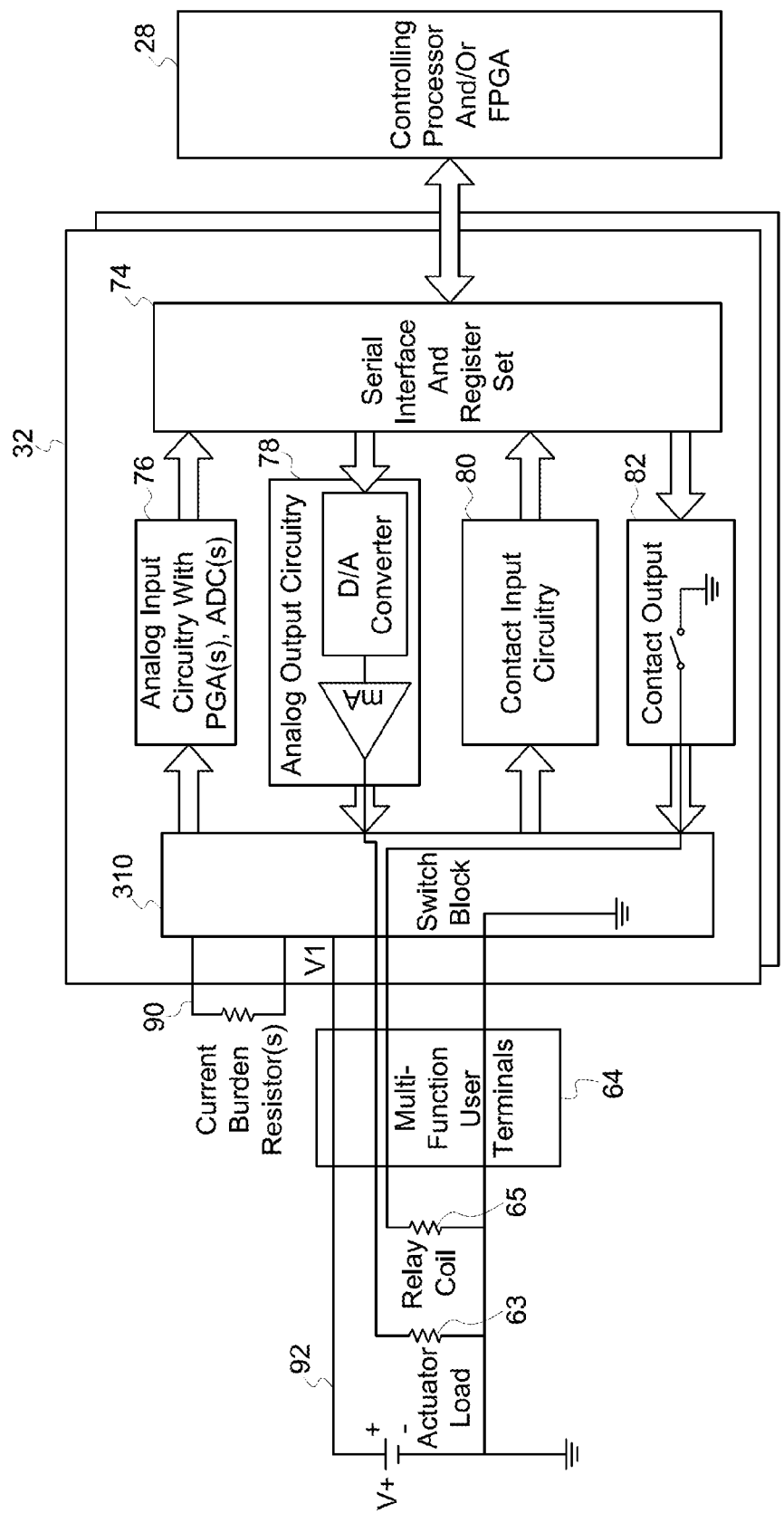
FIG. 9 is a block diagram of an ASIC in accordance with an embodiment of the present invention.

Referring now to FIG. 9, a block diagram of another exemplary embodiment of an ASIC that is configured, in this embodiment, for current output on a first channel and a high side contact output 82 on a second channel. In this embodiment, the analog output 78 is connected to an actuator load 63 and the contact output 82 is connected to relay coil 65 through the switch block 310 and user terminal 64. Furthermore, in this exemplary embodiment, the analog input circuitry 76 may comprise a PGAs and ADCs, the analog output circuitry 78 may comprise DACs, and the contact output 82 may comprise a switch. Each of the analog input and output circuitry 76, 78, and the contact input and output 80, 82, are coupled to the controlling processor through a serial interface. The analog output 78 provides a continuously variable signal to the actuator load 78, such as when the load is controlled by a closed loop program operating with inputs via other modules. The contact output 82 driving the relay coil is a high side switch, providing a controlled connection to the supply V+ where the relay coil is connected to ground.

Figure 10:
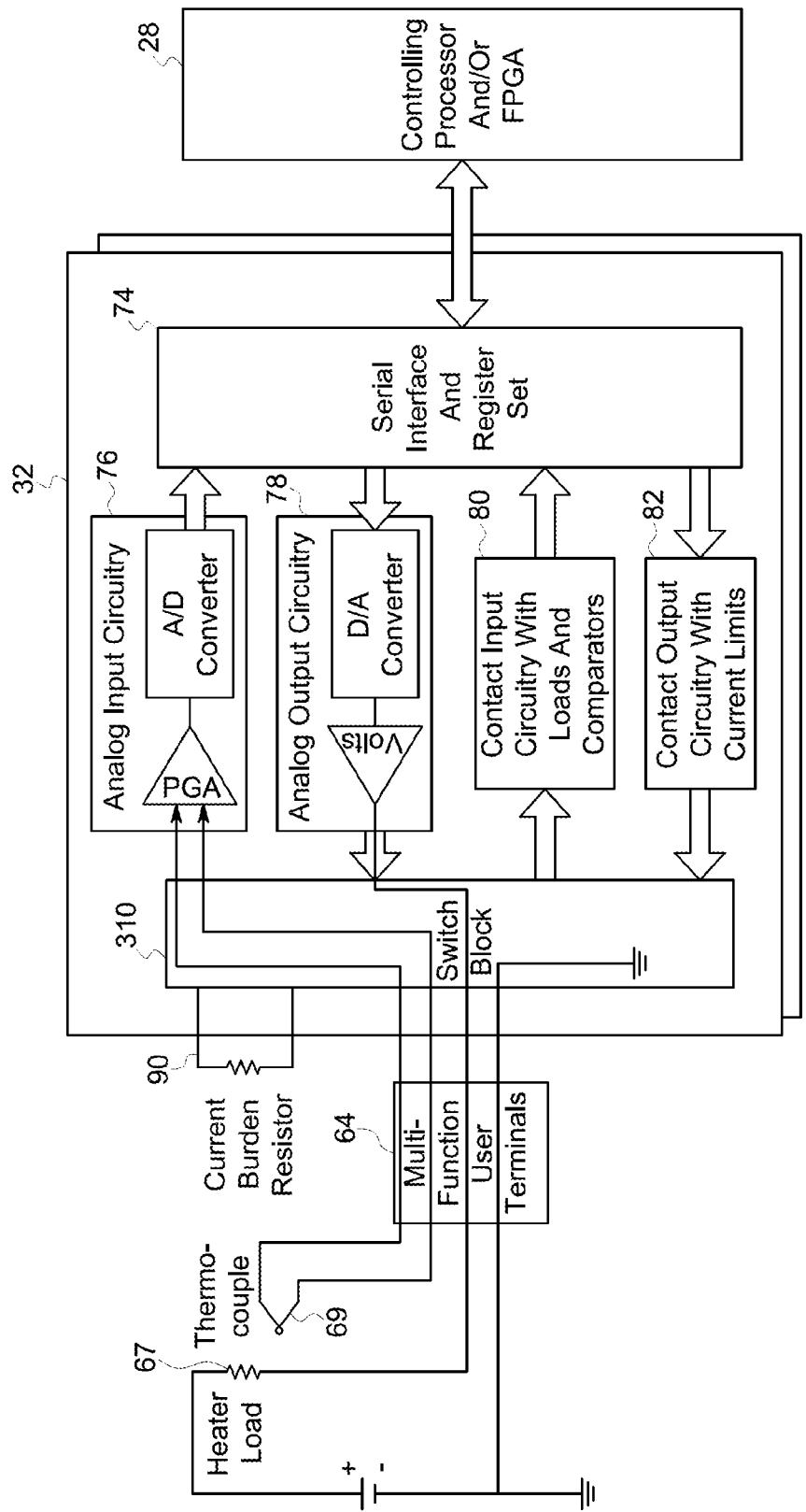
FIG. 10 is a block diagram of an ASIC in accordance with an embodiment of the present invention.

Now with reference to FIG. 10, a block diagram of another exemplary embodiment of an ASIC that is configured, in this embodiment, for current input on a first channel and voltage output 82 on a second channel. In this embodiment, the user circuitry comprises a thermocouple 69, which is coupled to the analog input circuitry 76 through the user terminal 64 and switch block 310. The analog output circuitry is coupled to an external heater load 67 through the user terminal and switch block 310. Each of the analog input and output circuitry 76, 78, and the contact input and output 80, 82, are coupled to the controlling processor through a serial interface. In this exemplary embodiment, a random set of ASIC channels are being assigned in a system having many thermocouples and loads.

Figure 11:
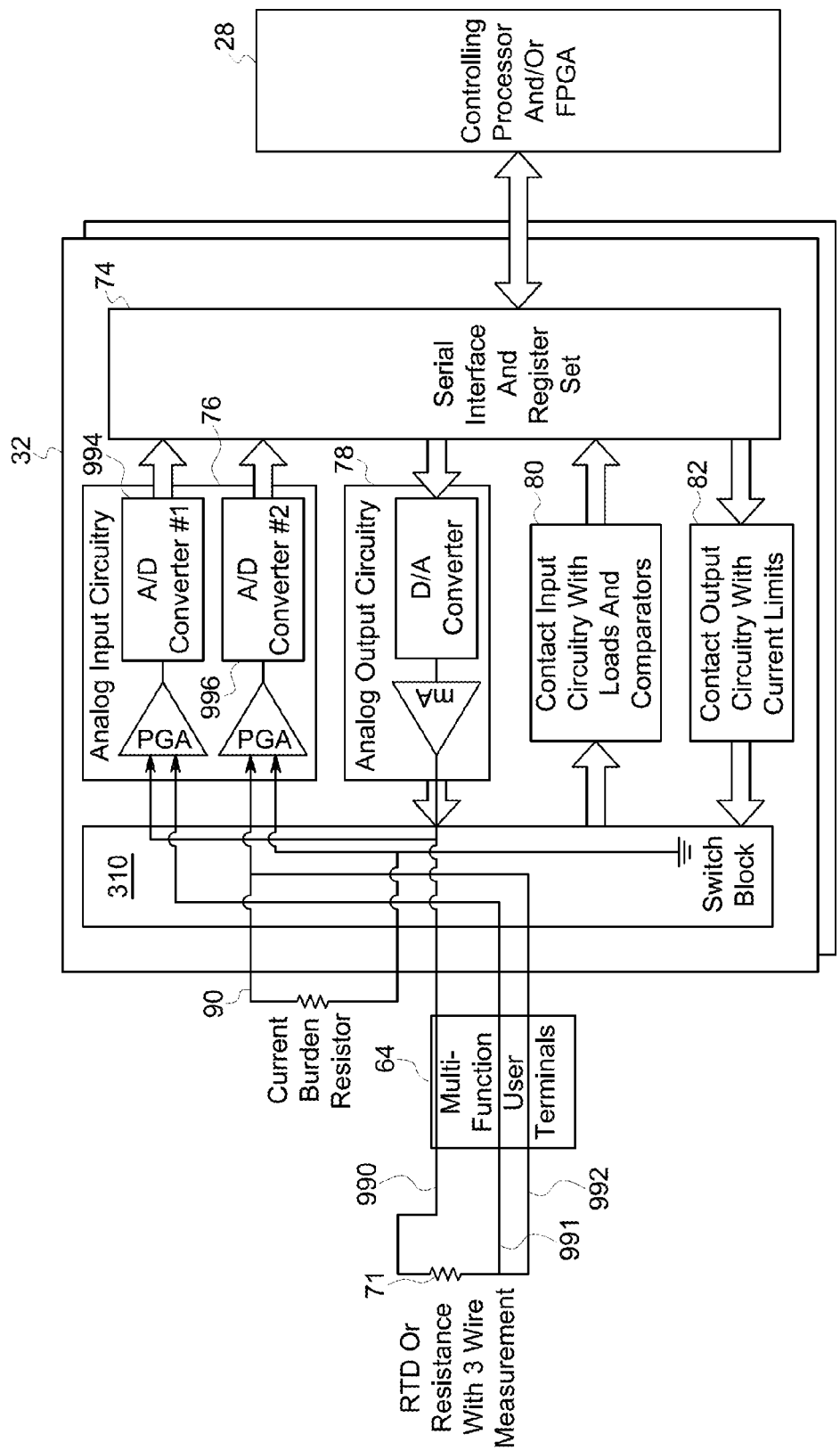
FIG. 11 is a block diagram of an ASIC in accordance with an embodiment of the present invention.

Now with reference to FIG. 11, a block diagram of another exemplary embodiment of an ASIC that is configured, in this embodiment, for temperature measurement using a three wire RTD such that both channels combine to measure resistance using a controlled current output while measuring voltage across resistance and current through resistance. In this embodiment, the user circuitry comprises a three wire RTD 71, in which three connections 990, 991, and 992 are coupled to the analog input circuitry 76 through the user terminal 64 and switch block 310 to provide a measurement of voltage across the RTD as provided by voltage between 990 and 991. The input circuitry is further connected to pass the signal on 992 to the current external burden resistor 90) through the switch block 310 with the resistor's voltage passed in turn via the switch block 310 to the PGA and A/D converter 996 for a measurement of current through the burden resistor. The analog output circuitry 78 is set to provide a current through the switch block 310 to the RTD via connection 990. Each of the analog input and output circuitry 76, 78, and the contact input and output 80, 82, are coupled to the controlling processor through serial interface 74. In optional embodiments of the present invention, 2, 3, and 4 wire RTDs supported by the paths within the switch block may be used.

With this ASIC, the channels may be independently set for current loop input, current loop output, voltage input (e.g., spanning from thermocouple up to +/−10V signal levels), voltage output, RTD input (2, 3, or 4 wire input). Furthermore, burnout detection is provided for thermocouple operation.

Figure 12:
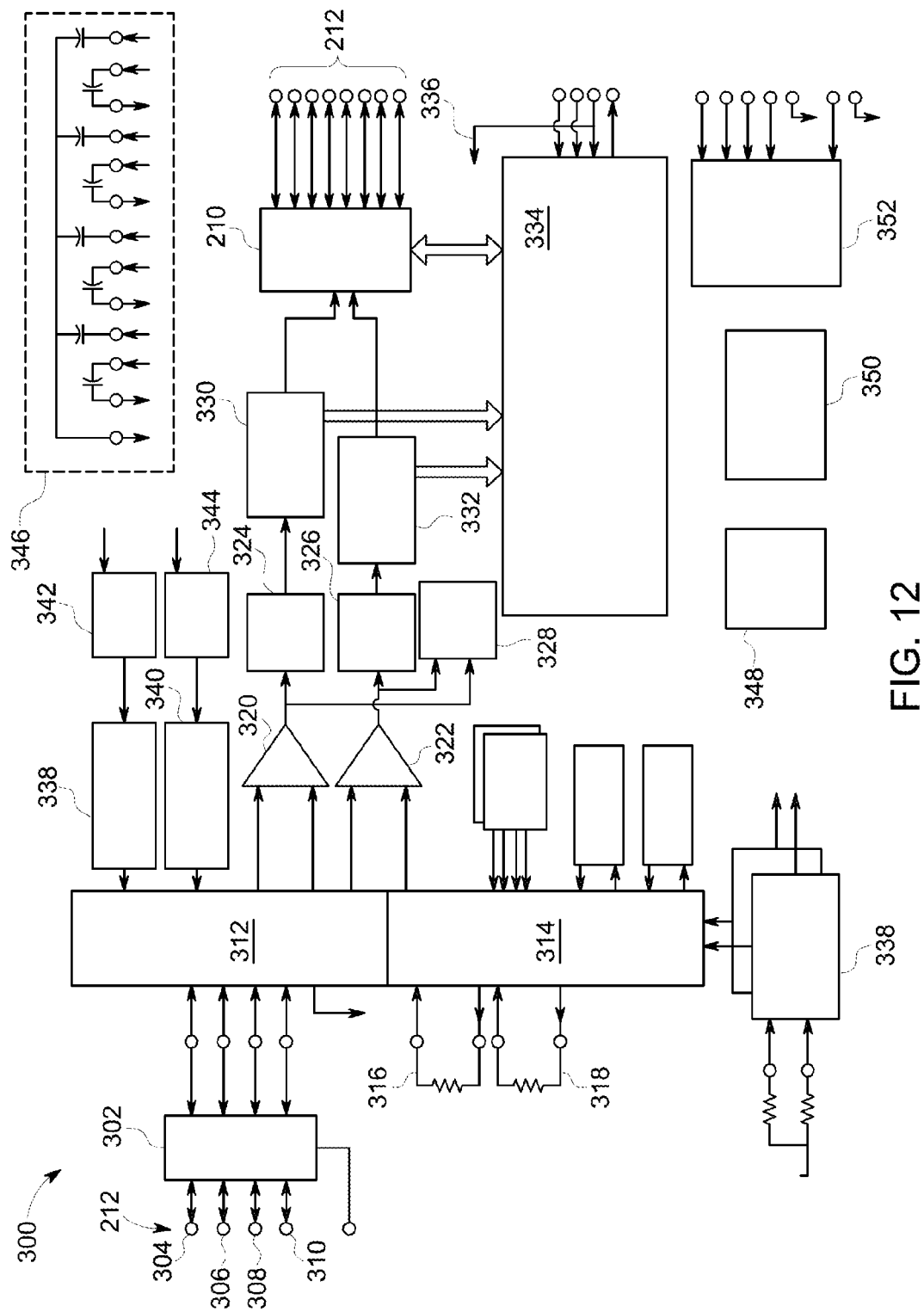
FIG. 12 is a schematic block circuit diagram of an exemplary ASIC in accordance with an embodiment of the present invention.

Referring now to FIG. 12, a block diagram for an embodiment of the ASIC 32, together with external resistors and capacitors connected to the ASIC, is shown generally at 300. The ASIC allows various user terminals to accept and condition various input signal standards through a single pin 212. In an optional embodiment of the present invention, the I/O module drives various output signaling standards. Note that the filter components 302 may be either internal or external. The ASIC connects various types of I/O for each channel to a set of four I/Os 304, 306, 308, 310, with the ASIC 32 internally providing switching between the terminals and the internal analog to digital (A/D) and digital to analog (D/A) functions. The I/Os 304-310 are coupled to EMI and EMC filters 302 residing outside the ASIC. The filters 302 are coupled to a first channel switch block 312 and second channel switch block 314, which, in turn, are coupled to a first and second current sensing resistors 316 and 318, which reside outside of the ASIC. The first and second channel switch blocks, 312 and 314 are coupled to differential amplifiers 320 and 322, which are further coupled to first and second low pass filter 324 and 326 using external components 346 to set the signal bandwidth. A low side switch protection circuit 328 is coupled between each amplifier and low pass filter, where the protection circuit monitors the voltages occurring within the switches 338. Each of the first and second low pass filters 324 and 326 are coupled to a first and second A/D converter 330 and 332, each of which are coupled to logic section 334.

Logic section 334 may comprise an SPI interface, internal registers and controlling state machines. The logic section 334 is further coupled to a logic clock, and is also the physical interface to the GPIO 210, which comprises dual function pins 212.

In operation, each of the differential amplifiers 320 and 322 may operate, for example, with a common mode ranging between −10V and the loop supply (e.g., nominal 24V) where the negative span allows for both voltage input ranges as well as accidental connection of terminals to an adjacent channel with negative inputs applied. The common mode rejection for balanced impedance input on differential voltage inputs used in RTD and T/C may support, for example, 110 dB minimum at 60 Hz with 8 Hz post processing filters shared between each hardware and software/FPGA filters 324 and 326 having input impedance as seen at the switch block 338 on the order of 10 meg-ohms, which maintains predetermined accuracy requirements.

In an exemplary embodiment of the present invention, the low pass filters 324 and 326 are configured for anti-aliasing protection on the signal spectra, and the gain amplifier 320 and 322, with a gain/attenuation range may have less than 50 mV (for thermocouples) to greater than 30V (for contact inputs) as inputs. The analog to digital converters 330 and 332 may comprise a Delta Sigma Modulation (DSM) having binary output both drives decimation filters and a binary signal (DSMOUT, synchronous to the ASIC master clock for HART FPGA modem support) to the GPIO 210.

Voltage references for the ADCs 330 and 332 (and other analog blocks) are provided by regulator 352, where the references may be set for either an internal moderate accuracy signal or an externally provided voltage. Each reference input may also be made available to the terminal switching section to allow for built in diagnostics. This allows for the ADC input span to be programmable and vary channel to channel within an ASIC. If the internal reference is optimized for low cost for the majority of applications, a higher precision reference may be provided external to the ASIC. The logic section 334 also provided status within its responses to commands from the module controller 34, including a bit indicating presence of external reference voltage.

The single die further comprises temperature sensor and protection module 348, high side driver change pump 350, and internal regulators 352. The modules provide on-chip sensing of over-temperature and shutdown, specific to high wattage portions and other elements. The internal regulator 352 may report to the logic section 334 the presence of power voltages as a further diagnostic.

Figure 13:
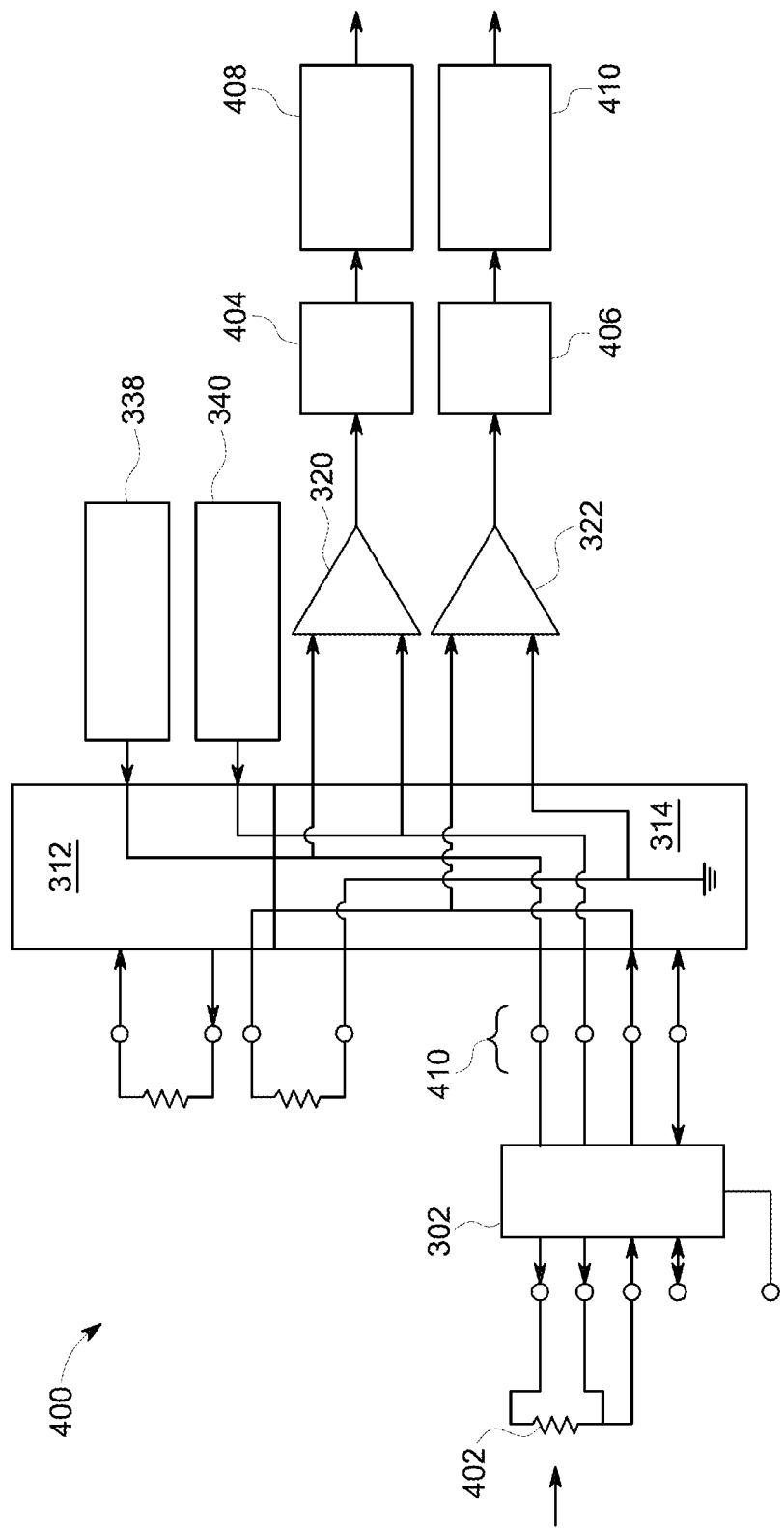
FIG. 13 is a schematic block circuit diagram of an exemplary ASIC in accordance with an embodiment of the present invention.

Referring now to FIG. 13, a block diagram for the ASIC channels allowing for random mixture, direction, and shared channels on a single die is shown generally at 400. A processor can take channel assignment, look up settings, and download switch settings through the SPI 36 (see FIG. 1). In this exemplary configuration, the peripheral is a resistance temperature detector 402, which is using two channels of an ASIC 400 and is coupled to each via I/O terminals 404. The switches in switch block 314 are connected to two current sources 338 and 340, and also to differential amplifier 320 and 322. Each amplifier 320 and 322 is coupled to first and second anti-aliasing low pass filters 404 and 406, the first low pass filter coupled to a first PGA 408 which is configured for channel 1 scaling and a second PGA 410 for configured for channel 2 scaling. The PGA outputs pass to the ADC 330 and 332, and the logic section 334 reports the measured and scaled values representing voltage across and current through the resistance. Scaling for the RTD type includes assignment of the expected resistance range (for span of voltage into the PGAs) and amount of current to the field terminals, with up to 2 mA available.

Figure 14:
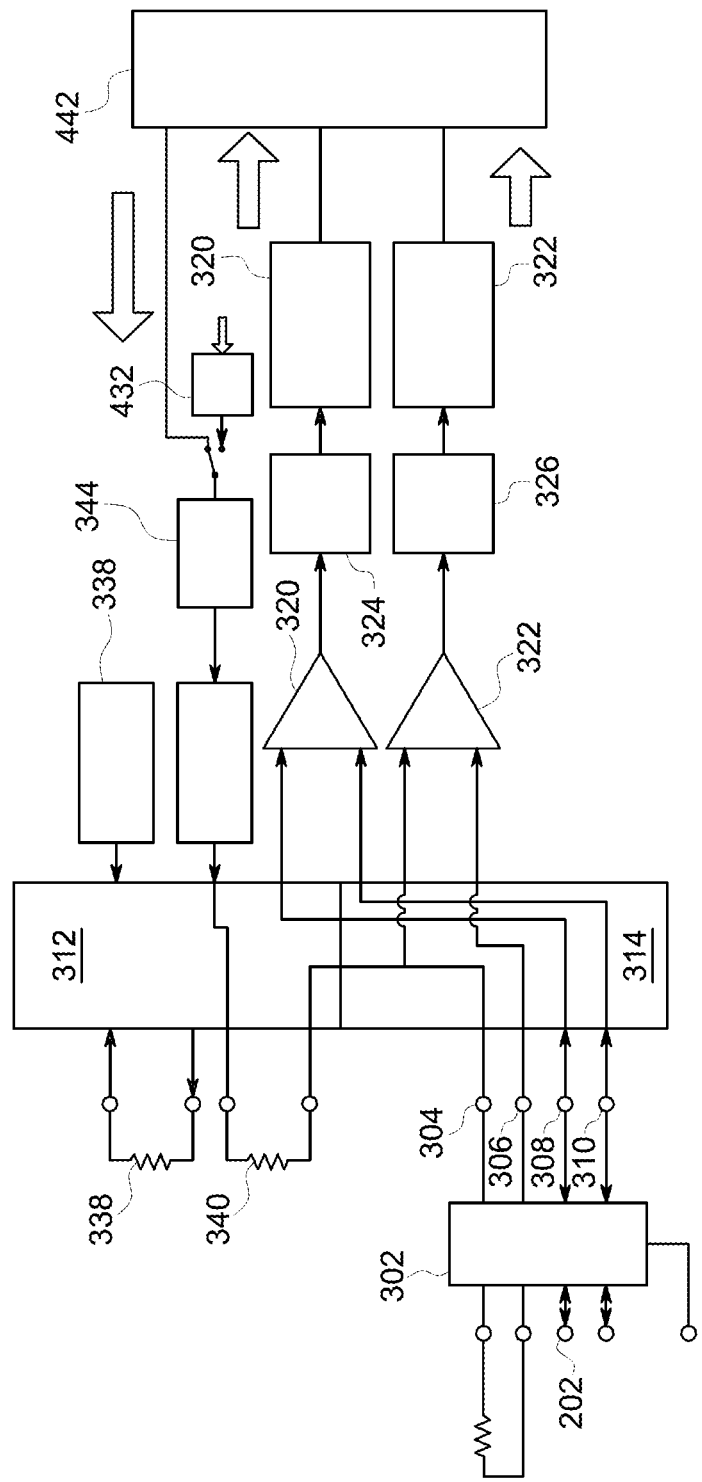
FIG. 14 is a schematic block circuit diagram of an exemplary ASIC in accordance with an embodiment of the present invention.
Figure 15:
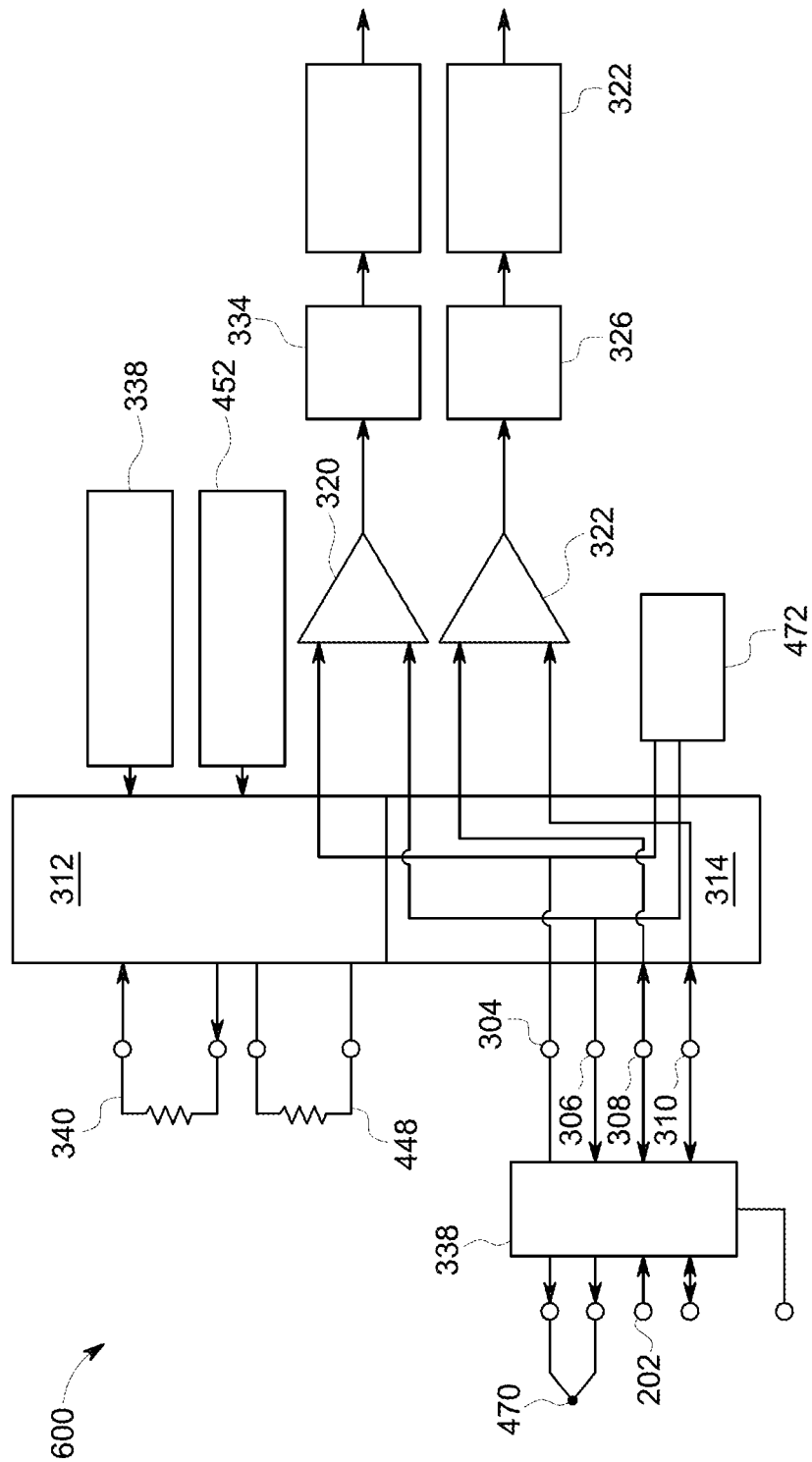
FIG. 15 is a schematic block circuit diagram of an exemplary ASIC in accordance with an embodiment of the present invention Like reference characters designate identical or corresponding components and units throughout the several views, which are not to scale unless otherwise indicated.

The ASIC may also be configured to support control, response, and data via SPI, and Delta Sigma Modulated (DSM) I/O bit streams (for HART FPGA modem support). This may be done within each channel within single ASIC or using channels across multiple ASICs. For example, as shown in FIG. 14, the ASIC supports HART protocol using channel #2 316 to control current flowing to a HART output device with channel #1's 312 sections used to monitor the current flow for fault detection. In operation, an EMI filter 302 is coupled to channel 312, and is coupled to each via I/O terminals 202. The switches in switch block 312 are connected to two current sources 338 and 340, and also to differential amplifier 320 and 322. A current source 338, while coupled to the switch, is disabled since the other channel is already in use within the ASIC. I/Os 304-310 are tied across to signals flowing from resistor 316 to each amplifier 322 and 320 is coupled to first and second anti-aliasing low pass filters 324 and 326, the first low pass filter coupled to a first PGA 320 which is configured for channel 1 scaling and a second PGA 322 for configured for channel 2 scaling. The current to the load is commanded by D/A 344 by a delta sigma bit stream provided by the FPGA 442, where the information equates to the combination of a commanded current as well as periodic tones per the HART protocol. The terminal voltage at the load is sensed by ADC 332 to detect tones originating in the HART load, meant as responses to the commands sent by the tones on the current. The ASIC may in peer-to-peer mode (analog/digital) the digital signals are overlaid on the 4-20 mA loop current. Both the 4-20 mA current and the digital signal are valid output values from the instrument. The polling address of the instrument is set to "0". Only one instrument can be put on each instrument cable signal pair. One signal, generally specified by the user, is specified to be the 4-20 mA signal. Other signals are sent digitally on top of the 4-20 mA signal. For example, pressure readings can be sent as 4-20 mA, representing a range of pressures, and temperature readings can be sent digitally over the same path. In "multi-drop" mode, only the digital signals are sent. In an exemplary embodiment, the analog loop current may be fixed at 4 mA. In multi-drop mode, more than one peripheral may exist on one a signal cable.

A channel on the die may comprise a channel for thermocouple inputs. In this exemplary configuration shown in FIG. 15, the peripheral is a thermocouple temperature detector 470, which is using one of the two available channels from an ASIC, and is coupled to each via I/O terminals 304 and 306. The switch 312 is connected to two current sources 338 (which is not used for this function and disabled) and 340 which is available for use by a function using the other ASIC channel. Each PGA amplifier 320 and 322 is coupled to anti-aliasing low pass filters 330 and 332, with PGA 320 is set for signal gain by controller 34 via logic section 434 in accordance with the thermocouple type and the other PGA 322 available for the other channel's assigned function. The ADC 330 converts the PGA output to a value representing the temperature, where the controller 34 or system controller 50 may be used for conversion from units of scaled voltage to degrees of temperature.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

The construction and arrangement of the elements described herein are illustrative only. Although only a few embodiments have been described in detail in this disclosure, those of ordinary skill who review this disclosure will readily appreciate that many modifications are possible without materially departing from the novel teachings and advantages of the subject matter recited in the claims.

Accordingly, all such modifications are intended to be included within the scope of the methods and systems described herein.

The order or sequence of any process or method steps may be varied or re-sequenced according to alternative embodiments. Other substitutions, modifications, changes and omissions may be made in the design, operating conditions and arrangement of the embodiments without departing from the spirit and scope of the methods and systems described herein.

What is claimed is:

1. An input/output (I/O) module for use in an industrial control system and connectable to a programmable logic controller (PLC), the input/output module comprising:
   a local I/O connector having a plurality of pins configured for connection to one of a plurality of peripherals to the I/O module;
   an application specific integrated circuit (ASIC) disposed in the I/O module and electrically coupled to a system controller, the ASIC having a plurality of connection paths;
   a switch block configured to reassign a signal from a first connection path of the plurality of connection paths to a second connection path of the plurality of connection paths;
   a die temperature sensor and protection element;
   a high side driver charge pump; and
   an internal voltage regulator, each of the die temperature sensor, high side driver and internal voltage regulator being in communication with the systems controller.

2. The I/O module of claim 1, wherein each of the plurality of connection paths are electrically isolated and each of the plurality of connection paths are configured for a separate I/O function.

3. The I/O module of claim 1, wherein the switch block further comprises a plurality of channels in communication with each of the connection paths, wherein the switch block is configured to assign each of the channels to one of the separate I/O functions.

4. The I/O module of claim 1, further comprising a systems controller, wherein the systems controller is configured to locate an assignment for one of the switches and access a switch setting through a serial peripheral interface (SPI).

5. The I/O module of claim 1, wherein the systems controller is further configured to reconfigure the connection paths, such that two or more I/O functions are operable on a single path.

6. The I/O module of claim 1, further comprising a noise protection module disposed within of the I/O module, the noise protection module configured to suppress the noise and establish electromagnetic compatibility.

7. The I/O module of claim 6, further comprising:
a scaling and multiplexing module in communication with the systems controller, wherein the scaling and multiplexing module is configured to support delta sigma modulation (DSM); wherein the noise protection module is in communication with the scaling and multiplexing module.

8. The I/O module of claim 7, further comprising:
an analog I/O and a digital I/O;
wherein the scaling and multiplexing module is configured to establish a connection path between the analog I/O or digital I/O and one of the plurality of peripherals; and
wherein the analog I/O and digital I/O is disposed on a single card.

9. The I/O module of claim 7, wherein the scaling and multiplexing module is electrically coupled to a plurality of user terminals.

10. The I/O module of claim 7, wherein the scaling and multiplexing module is configured to support the connection paths and provide an interface to the SPI.

11. The I/O module of claim 7, wherein the I/O module further comprises:
a filter disposed externally from the ASIC and coupled to the scaling and multiplexing module;
a differential amplifier coupled to a first channel of the scaling and multiplexing module; and
a low pass filter and programmable gain amplifier coupled to the differential amplifier and configured to scale the first channel and provide anti-aliasing protection.

12. The I/O module of claim 4, wherein the SPI module is electrically coupled to a digital input and a digital output and is configured as a synchronous serial data link, the SPI module being further configured to operate in full duplex mode.

13. The I/O module of claim 1, wherein the ASIC is further configured to support the plurality of peripherals within a serial change of interconnected I/O modules.

14. An industrial control system for controlling processes, the control system having a programmable logic controller (PLC), the control system comprising:
a systems controller in communication with a network and coupled to the PLC;
an input/output (I/O) module connected to the PLC, and configured to drive a plurality of functions through a single I/O pin;
a die temperature sensor and protection element;
a high side driver charge pump; and
an internal voltage regulator, each of the die temperature sensor, high side driver and internal voltage regulator being in communication with the systems controller.

15. The industrial control system of claim 14, wherein the I/O module further comprises:
an application specific integrated circuit (ASIC) disposed in the I/O module and electrically coupled to the system controller, the ASIC having a plurality of connection paths, each path being configured for a function; and
a switch block configured to reassign a signal from a first connection path of the plurality of connection paths to a second connection path of the plurality of connection paths.

16. The system of claim 14, wherein the plurality of dedicated connection paths are electrically isolated and are disposed on a switch block, the switch block comprising a plurality of channels and at least two switches.

17. The system of claim 14, wherein the systems controller is configured to locate an assignment for one of the switches and access a switch setting through a serial peripheral interface (SPI).

18. The system of claim 14, wherein the systems controller is configured to reconfigure the connection paths, such that at least two functions are operable on a single connection path.

19. The system of claim 14, further comprising a noise protection module disposed inside of the I/O module, the noise protection module configured to suppress the noise and establish electromagnetic compatibility.

20. The system of claim 19, wherein the noise protection module is coupled to a scaling and multiplexing module.

21. The system of claim 20, wherein the scaling and multiplexing module is configured to support delta sigma modulation (DSM) and the I/O module further comprises a DSM I/O pin.

22. The system of claim 20, wherein the I/O module further comprising:
an analog I/O a digital I/O;
wherein the scaling and multiplexing module is configured to establish a connection path between the analog or digital I/O and one of a plurality of peripherals; and
wherein the analog and digital I/Os are disposed on a single card.

23. The system of claim 21, wherein the scaling and multiplexing module is electrically coupled to a plurality of user terminals, and configured to internally reconfigure the plurality of connection paths.

24. The system of claim 20, wherein the scaling and multiplexing module comprises a plurality of channels, the plurality of channels configured to support the dedicated connection paths and provide an interface to a SPI.

25. The system of claim 15, wherein the I/O module further comprises:
a filter disposed externally from the ASIC and coupled to a scaling and multiplexing module;
a differential amplifier coupled to a first channel of the scaling and multiplexing module; and
a low pass filter and a programmable gain amplifier coupled to the differential amplifier and configured to scale the first channel and providing anti-aliasing protection.

26. The system of claim 17, wherein the SPI module is electrically coupled to a digital input and a digital output and is configured as a synchronous serial data link, the SPI module being further configured to operate in full duplex mode.

27. The system of claim 15, wherein the ASIC is further configured support a plurality of peripherals within a serial change of interconnected I/O modules.

28. The system of claim 14, further comprising a human machine interface coupled to the systems controller.

* * * * *

UNITED STATES PATENT AND TRADEMARK OFFICE
CERTIFICATE OF CORRECTION

PATENT NO. : 8,806,085 B2
APPLICATION NO. : 13/570575
DATED : August 12, 2014
INVENTOR(S) : Mathason et al.

It is certified that error appears in the above-identified patent and that said Letters Patent is hereby corrected as shown below:

In Column 9, Line 28, delete "resistor 90)" and insert -- resistor 90 --, therefor.

In Column 14, Line 32, in Claim 22, delete "I/O a digital" and insert -- I/O and a digital --, therefor.

In Column 14, Line 61, in Claim 27, delete "configured support" and insert -- configured to support --, therefor.

Signed and Sealed this
Ninth Day of August, 2016

Michelle K. Lee
*Director of the United States Patent and Trademark Office*